(No Model.) 2 Sheets—Sheet 1.

J. P. HANNA.
PUMP.

No. 444,434. Patented Jan. 13, 1891.

Witnesses:

Inventor
James P. Hanna
By his Attorneys,
C. A. Snow & Co.

(No Model.) 2 Sheets—Sheet 2.

J. P. HANNA.
PUMP.

No. 444,434. Patented Jan. 13, 1891.

Witnesses:

Inventor,
James P. Hanna,
By his Attorneys,

UNITED STATES PATENT OFFICE.

JAMES P. HANNA, OF WELLINGTON, MICHIGAN, ASSIGNOR OF ONE-HALF TO T. E. HASTINGS, OF SAME PLACE.

PUMP.

SPECIFICATION forming part of Letters Patent No. 444,434, dated January 13, 1891.

Application filed July 28, 1890. Serial No. 360,210. (No model.)

*To all whom it may concern:*

Be it known that I, JAMES P. HANNA, a citizen of the United States, residing at Wellington, in the county of Crawford and State of Michigan, have invented a new and useful Pump, of which the following is a specification.

This invention relates to pumps; and it has for its object to provide a pump which shall be simple in construction and easily operated. With this end in view it consists in the improved construction and arrangement of parts to be hereinafter fully described, and particularly pointed out in the claim.

Figure 1:
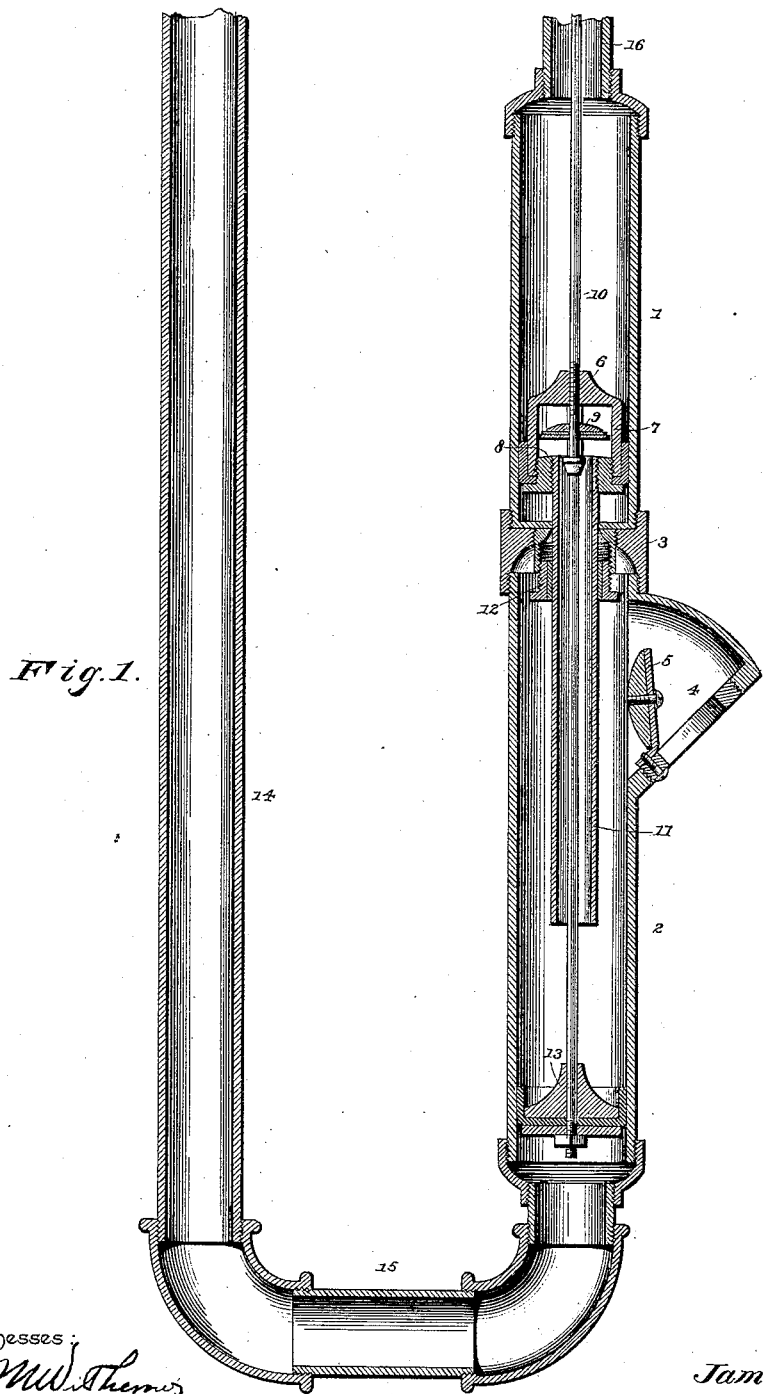
Figures 2, 3:
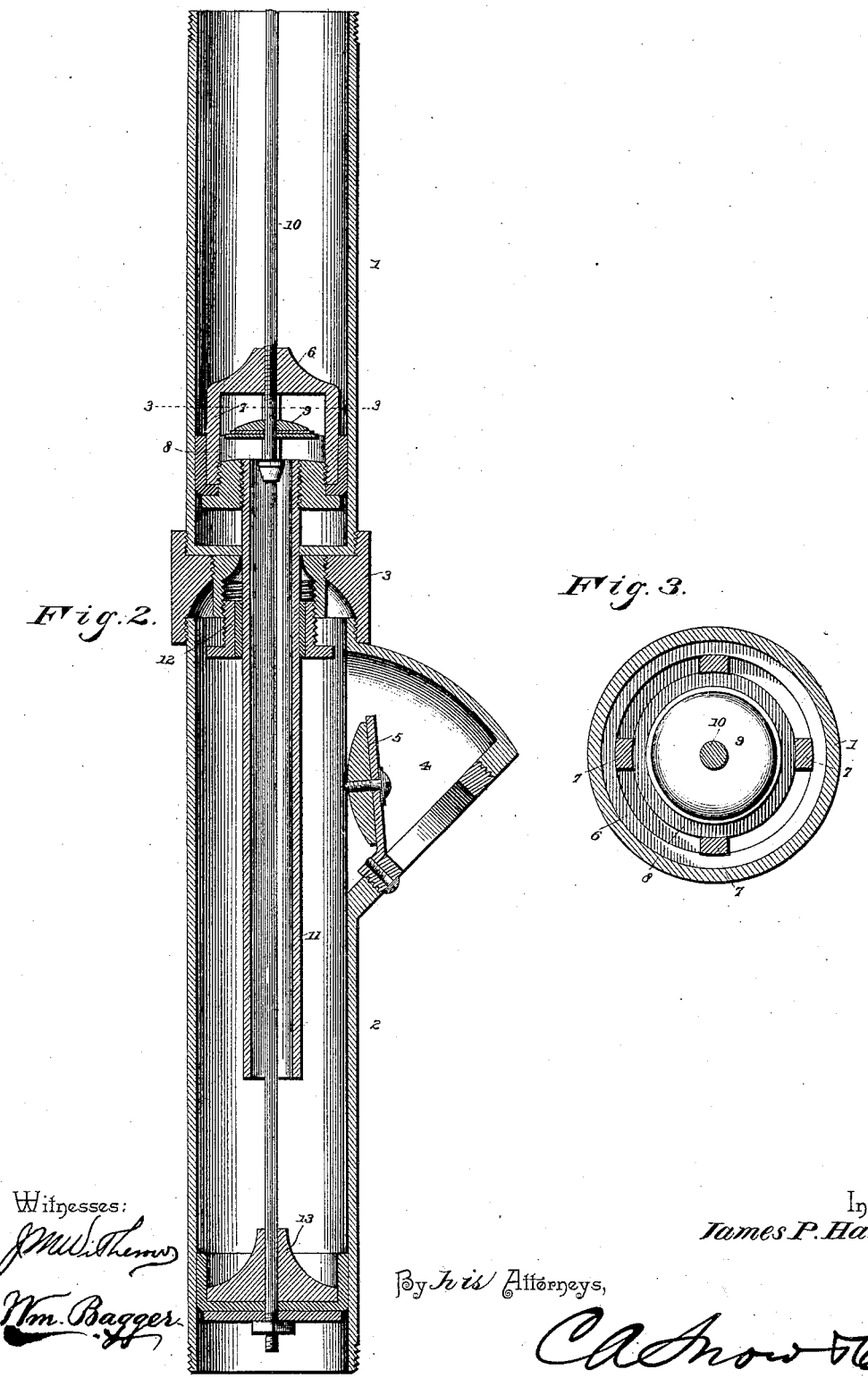

In the drawings, Figure 1 is a vertical sectional view of a pump embodying my improvements. Fig. 2 is a vertical sectional view, on a larger scale, of the pump-cylinders. Fig. 3 is a sectional view taken on the line 3 3 of Fig. 2.

Like numerals of reference indicate like parts in all the figures.

1 and 2 designate, respectively, the upper and lower pump-cylinders, which are connected by means of a suitable coupling 3. The lower cylinder 2 is provided at or near its upper end with a laterally-extending branch 4, forming the suction-pipe, and in which is arranged an upwardly-opening valve 5. 6 designates the plunger which works in the upper cylinder, and which consists of a cage 7, having a valve-seat 8 for the valve 9, which is mounted to slide vertically upon the piston-rod 10, upon which the valve-cage 7 is securely mounted and which extends through the said cage. The latter is provided with a downwardly-extending tube 11, which extends through a packing-box 12, arranged in or forming a part of the coupling 3. The piston-rod 10 extends downwardly through the tube 11 and carries at its lower end a solid piston or plunger 13, that works in the lower cylinder.

14 designates a vertical stand-pipe, which is connected with the bottom of the lower cylinder 2 by means of a U-coupling 15.

16 is the discharge-pipe, which extends upwardly from the top of the upper cylinder 1.

In operation, on the downstroke of the piston-rod the plunger 13 is caused to descend in the lower cylinder and the valve 9 drops to its seat by gravity and by the weight of the superimposed water. The valve 5 opens and admits water through the inlet-pipe into the bottom cylinder above the plunger 13. On the upstroke the plunger 13 forces the water through the pipe 11 and under the valve 9 into the upper cylinder and upwardly through the discharge-pipe. The stand-pipe 14 is to be filled with the water, which will equally balance the water contained in the cylinders and the discharge-pipe, thus rendering the operation of the pump very much easier than if the entire weight of the water in the discharge-pipe had to be lifted on each upstroke of the piston-rod.

Having thus described my invention, what I claim is—

In a pump, the combination of the upper and lower cylinders 1 2, the coupling 3, the packing-box 12, constructed in said coupling, the plunger-rod 10, having the valved plunger 6, working in the upper cylinder, the tube 11, extending from said valved plunger through the packing-box 12 into the lower cylinder, the solid plunger working in the latter and mounted upon the lower end of the plunger-rod, the inlet 4 at the upper end of the lower cylinder, having valve 5, the exit-pipe 16, extending upward from the upper cylinder, the stand-pipe 14, and the coupling 15, connecting the latter with the lower end of the lower cylinder, substantially as and for the purpose set forth.

In testimony that I claim the foregoing as my own I have hereto affixed my signature in presence of two witnesses.

JAMES P. HANNA.

Witnesses:
JOHN LEECE,
FRANK A. BELL.